United States Patent [19]

Wartes

[11] 3,884,217
[45] May 20, 1975

[54] METHOD AND APPARATUS FOR COLLECTING SOLAR ENERGY

[75] Inventor: Lloyd Lore Wartes, Denver, Colo.

[73] Assignee: Ecothermia, Inc., Denver, Colo.

[22] Filed: Sept. 20, 1972

[21] Appl. No.: 290,663

[52] U.S. Cl. .................. 126/270; 126/271; 350/299
[51] Int. Cl. .............................................. F24v 3/02
[58] Field of Search ............ 126/270, 271; 350/294, 350/299

[56] References Cited
UNITED STATES PATENTS

| | | | |
|---|---|---|---|
| 509,390 | 11/1893 | Paine | 126/270 |
| 514,669 | 2/1899 | Allingham | 126/270 |
| 1,696,003 | 12/1928 | Harvey | 126/270 |
| 2,182,222 | 12/1939 | Courtis et al. | 126/270 |
| 2,213,894 | 9/1940 | Barry | 126/271 |
| 2,902,028 | 9/1959 | Manly | 126/271 |
| 3,118,437 | 1/1964 | Hunt | 350/294 |
| 3,466,119 | 9/1969 | Francia | 350/299 |

Primary Examiner—William F. O'Dea
Assistant Examiner—Peter D. Ferguson
Attorney, Agent, or Firm—Browne, Beveridge, DeGrandi & Kline

[57] ABSTRACT

Solar rays strike a plurality of flat elongated reflector units. The bodies are arranged so that the beams of light reflected therefrom converge at an energy receiving means. The individual reflector units are rotated about their horizontal axes of elongation as the elevation of the sun changes, thereby maintaining a convergence of the reflected rays; and, the relative inclination between the individual reflector units is changable in order to control the intensity of the energy at the energy receiving means. The reflected energy is directed toward an energy receiving means which has a housing with an internal cavity. The energy enters a lower portion of the cavity and is directed upon a fluid-carrying conduit located in the upper portion of the cavity.

12 Claims, 3 Drawing Figures

PATENTED MAY 20 1975　　　　　　　　　　　　　　3,884,217

METHOD AND APPARATUS FOR COLLECTING SOLAR ENERGY

This invention relates to a method and apparatus for collecting radiant solar energy, with the principal features thereof constituting improvements in the solar reflector assembly and in the structure of the energy receiving means where the concentrated solar energy converges.

There have been numerous proposals for utilization of solar energy by means of reflector units which direct and concentrate reflected solar energy on an energy receiving means which may be an evaporator unit or a conduit for a heat exchange medium. Unlike fuel-burning systems, such solar devices provide a non-polluting source of usable energy. In many prior systems, one or more reflector units are mounted on a framework which changes its inclination in dependence upon the elevation of the sun, thereby assuring that the reflected solar energy will always be directed at the energy receiving means. These previous systems impose severe restrictions on the size of the reflector assembly since it must be capable of swinging movement in a vertical plane.

In some earlier systems, frames have carried a plurality of individually inclinable reflector units of parabolic cross-section, with each reflector unit having its own energy receiving means located at the focus of the parabola. These prior devices differ from the presently disclosed invention which has a single energy receiving means which receives reflected solar energy from a plurality of individually inclinable reflector units.

This invention involves a number of interrelated concepts which are preferably but not essentially utilized together to provide a system of optimum capabilities. According to one of the inventive concepts, a plurality of spaced reflector units are oriented to produce converging beams of light, with means being provided for changing the inclination of each reflector unit. This arrangement lends itself for use in connection with control means for producing changes in the relative inclination between the individual reflector units so as to vary the intensity of the reflected radiant energy striking the energy receiving means.

The individual inclinability of the several reflector units permits their utilization with a control means for producing equal angular movements of all units about their respective horizontal axes of rotation during normal operation of the apparatus. This equal angular movement is related to the apparent elevation of the sun to cause the reflected light to strike the means which receives the reflected radiant energy.

A further concept used in the disclosed apparatus involves a plurality of horizontally elongated reflector units which are spaced from each other to permit the passage of wind therebetween. This basic structure will enable large installations to resist and withstand the forces imposed by high velocity winds.

Another concept suitable for use with the invention, although not altogether new, pertains to a supporting means which permits rotation of the elongated reflector units about a vertical axis which is related to the apparent azimuth of the sun. This supporting means is operated by a control means to cause the rays of the sun to lie normal to a horizontal line on each reflector unit to achieve maximum utilization of the solar energy. In connection with this, it is preferred that the horizontal axes of the reflector units are horizontally immovable with respect to each other, and that all reflector units are horizontally rotated about a single vertical axis which is a vertical pivot axis of the frame which carries all of the reflector units.

Another concept of the invention is concerned with the structure and method of the energy receiving means itself wherein the concentrated radiant energy is reflected upwardly into an inverted chamber the upper portion of which contains conduits for a heat exchange medium.

The invention may take many forms, a preferred one of which is shown in the accompanying drawings wherein.

Figure 1:
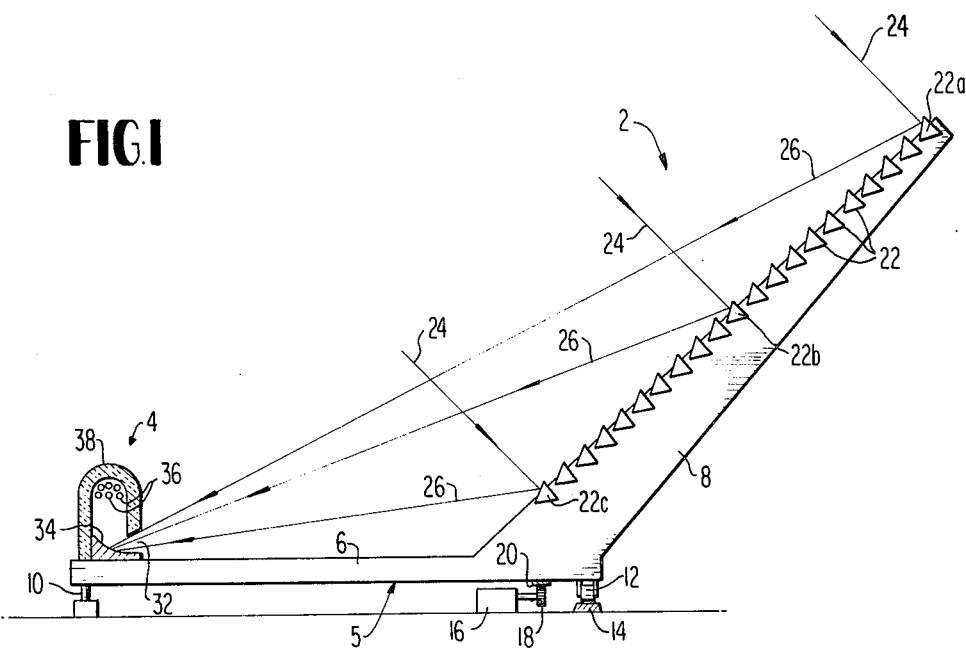
FIG. 1 is a side elevation of a system constructed according to the invention.

The primary reflector assembly 2 and the energy receiving means 4 are carried on a main fram 5 which has a horizontal portion 6 and an inclined portion 8, the latter of which carries the reflector assembly 2. The main frame of the apparatus is constructed to swing in a horizontal arc about the vertical pivot pin 10 which establishes the vertical axis of rotation for all individual units of the reflector assembly. A plurality of rollers, one of which is shown at 12, are connected to the outer portion of the frame 5 and ride on a arcuate trackway 14. Preferably, control means are used to drive the frame about the axis of the pin 10 so that the elongated horizontal axes of the individual reflector units will always lie approximately normal to the incident rays of the sun. This control means may act on the frame itself by means of a stationary motor 16 which has its drive shaft connected to a pinion 18 which meshes with an arcuate rack gear 20 on the frame.

The reflector assembly 2 is formed of a large number of individual reflector units 22 which are spaced apart to permit the passage of wind therebetween. The uppermost of these reflector units is designated 22a, the medial unit is designated 22b and the lowermost reflector unit has been designated 22c.

Each of the reflector units is a horizontally elongated triangular prism, the central axis of which is immovable with respect to the inclined portion 8 of the main frame 5. Rotation of all reflector units will usually be in equal amounts, but for purposes which will be described below it is desirable to provide control means which permits changes in the relative inclination of the reflective surfaces of the different reflector units.

The parallel solar rays 24 strike the mirrored reflective faces of the reflector units, to be reflected as beams 26 which focus as they approach the energy receiving means 4. The reflected beam 26 from the uppermost reflector unit 22a is, of course, at a greater inclination from a horizontal plane than is the reflected ray 26 from the lowermost reflector unit 22c. In order to achieve this relationship, the reflective surface of the reflector 22a must be at a greater inclination from the horizontal plane than the reflective surface of the lowermost reflector unit 22c. The inclination of the reflective face of the medial unit 22b must lie between that of the reflector units 22a and 22c with all of the remaining reflector units 22 also being slightly inclined with respect to each other.

The utilization of many flat reflective surfaces which are spaced from each other is particularly desirable since such an arrangement permits wind to pass through the reflector assembly. The importance of this feature is particularly significant when the reflector assembly has an overall of thousands of square feet, which would render it highly vulnerable to wind damage if it were a continuous surface.

One important reason for the prismatic shape of the individual reflector units is that it gives the unit a degree of structural rigidity which is unavailabile in flat mirrors, so that the reflector units do not bow excessively due to their own weight or when subjected to high velocity winds.

Another desirable feature of the prismatic structure of the reflector units is that it provides multiple surfaces. If desired, the respective surfaces may be provided with a mirror finish for use on cloudy days, a polished aluminum finish for use on sunny days and a scour-resistant face which may be a light-colored rubber or plastic for exposure to the elements in the event of sandstorms which would be injurious to the silvered or polished reflective surfaces. If more than one of the surfaces of the reflector unit is reflective, it is possible to have one such surface in use while the other surface is being polished or cleaned preparatory to its service.

Figure 2:
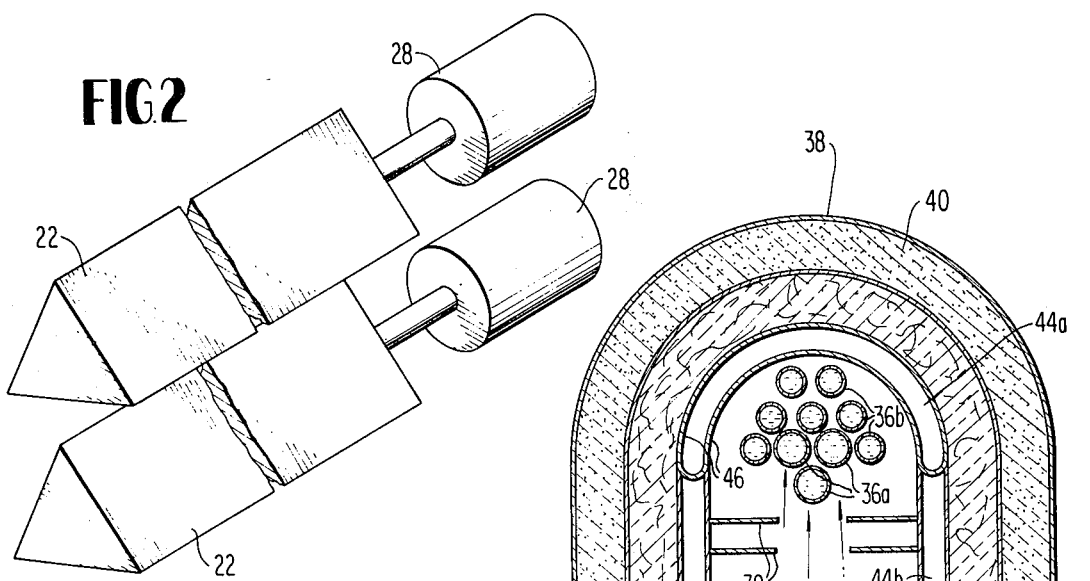
FIG. 2 is an enlarged fragmentary view of two of the reflector units showing their preferred construction; and, FIG. 3 is an enlarged view of the energy receiving means which includes a secondary reflector, a heat trap and collector conduits for a heat exchange medium.

As illustrated in FIG. 2, the individual reflector units may be operated by stepping motors 28. These stepping motors may receive actuating pulses from a storage or memory device which utilizes punched paper tape or a magnetic recording medium which is programmed according to the known astronomical position of the sun in order to position the reflector surface properly. Several adjacent reflector units may be operated by a common stepping motor since there is little angular difference between adjacent reflector units.

One advantage of having individual control of the reflector units is that it permits control of the intensity of the reflected light arriving at the energy receiving means 4. The amount of convergence of the reflected beams 26 may be varied so that the energy may be concentrated either in a very small area or a very large area as it arrives at the energy collecting means 4. This intensity control also may be used as a safety feature in the event of malfunction of the apparatus or the entry of birds or foreign objects in the high temperature zone in the vicinity of the energy receiving means 4. In such instances, the reflector units may be rotated so that their reflective surfaces are mutually parallel so that there may be no convergence of the reflected beams and no concentration of the solar energy by the apparatus.

The intensity of the energy arriving at the energy receiving means 4 may also be affected by rotating only some of the reflector units 22, for example by making their reflective surfaces normal to the sun so that the reflected solar energy will not be directed at the energy receiving means 4.

The energy receiving means 4 is an elongated assembly which corresponds in length to the individual reflector units 22. The light reflected by the reflector units 22 will form a highly concentrated beam which enters the energy receiving unit 4 through an elongated opening 32 and then strikes the reflective surface 34 which may be either flat or parabolic. The solar energy is reflected upwardly by the surface 34 and continues to converge until it strikes the energy absorbing conduits 36 which contain a circulating heat exchange medium. These conduits 36 are located in the upper portion of a chamber surrounded by inverted housing 38, which serves to trap the heat and prevent the conductive losses thereof.

Figure 3:
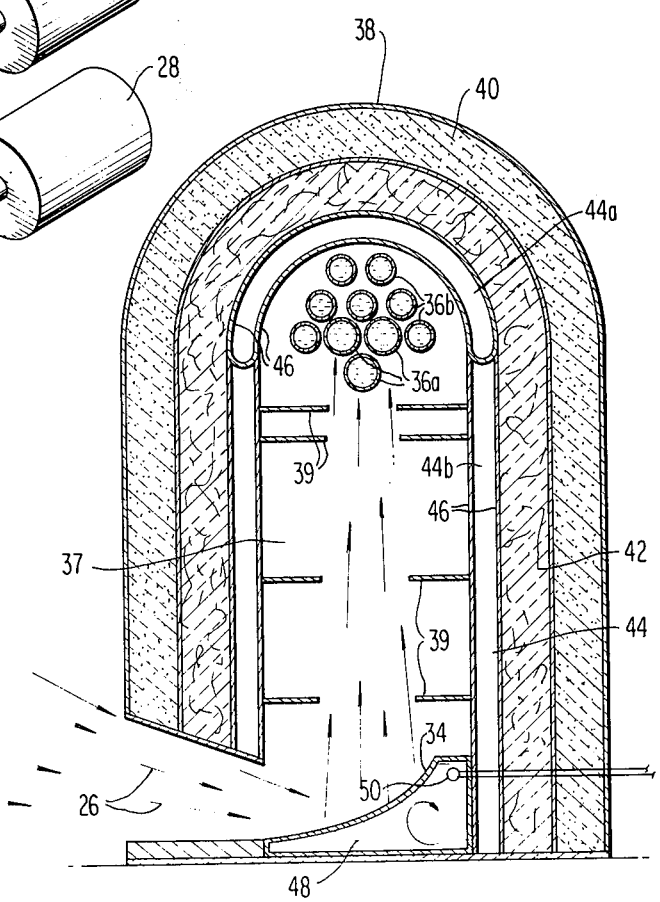

Referring to FIG. 3, it will be seen that the walls of the inverted housing 38 are formed in three layers with the outer layer 40 being of a supercellular material, the middle layer 42 being made of asbestos fiber thermal insulation and the innermost layer 44 being a hollow capsule with an upper portion 44a which is evacuated to minimize the transmission of heat therethrough, and a lower section 44b through which a gaseous heat transfer medium is circulated to remove heat for use in space heating or utilization in low heat conversion units.

Within the chamber 37, there are interiorly-extending baffles 38 which have light-reflecting upper surfaces and light-absorbing lower surfaces coated with carbon black or other material which will promote its absorption of radiant solar energy.

As previously explained, the convergent beams of light from the reflector assembly enter the energy receiving means 4 through the elongated opening 32. The solar energy then strikes the reflective surface 34 of an elongated hollow body filled with a heat transfer liquid 48 which is circulated therethrough under the influence of a pump or other circulating means. A temperature sensing device 50 such as a thermocouple may be used to control the rate of circulation of the liquid heat exchange medium 48 and to change the intensity of solar energy arriving at the reflective surface 34 in case of dangerous overheat.

The principal energy absorbing means is the heat exchange fluid contained in the conduits 36a, each of which is made of stainless steel and covered with carbon black pigment particles. These tubes carry a superheated heat exchange liquid to a storage cavern or to a heat exchanger where the thermal energy may be utilized or converted to other forms of energy suitable for future use. The nest of preheat transfer tubes 36b also carry a circulating liquid heat exchange medium. These tubes are copper and are covered with carbon black to promote their absorption of the solar energy. If desired, the tubes 36b may be arranged for series flow or they may be arranged in parallel with a common header at the opposite ends of the nest of tubes 36b. The liquid preheated by the tubes 36b may then be fed through the tubes 36a if desired where the heat exchange medium is heated to its maximum temperature.

Those skilled in the art will realize that extremely high temperature will exist within the heat receiving means 4 and that it may become necessary to utilize materials other than those listed above to provide sufficient safety factors for actual commercial operation. The liquid heat exchange medium may be the same as is used in shipboard or land-based nuclear reactor units. Liquid sodium, lead, mercury or various salts may be used.

The typical operation of the preferred embodiment of the invention will now be described. The parallel rays of the sun will strike the reflective surfaces of the adjustable reflector units 22 which are oriented to produce a convergence of the reflected light in an elongated area located at the energy receiving means 4. The reflector units 22 are individually rotated about their horizontal axes, either singly or in groups, to produce the continued convergence of the beams of light at the energy receiving means 4 throughout the changes of the elevation angle of the sun. These changes in inclination of the reflective surfaces are produced by the stepping motors or other devices which have been programmed according to the predetermined elevation angle of the sun.

As the azimuth of the sun changes, a memory device sends pulses to the motor 16, thereby rotating the gear 18 which drives the rack 20 and the frame 5 in a swinging movement about the vertical pivot 10. This movement is programmed so that the horizontal axes of the reflector units 22 will also remain normal to the incident rays 24 of the sun, following in the northern hemisphere the movement of the sun from an easterly direction to the south and finally to the west. In the southern hemisphere, the sun's azimuth will change from an easterly direction to the north and finally to the south. At a time after sunset and before sunrise, the apparatus is returned to a position where the axes of the reflections 22 will lie perpendicular to the sun at the forthcoming sunrise.

At all times during the normal operation of the apparatus, the rays of light 26 reflected by the reflector units 22 will converge in the area of the energy receiving means 4. However, when the temperature in this area becomes too high or when foreign objects approach the high temperature area of the apparatus, some or all of the reflector units 22 may be rotated about their horizontal axes to reduce the concentration of solar energy in the vicinity of the energy receiving means 4. This may be done by reducing the degree of convergence of the reflected beams 26 or by redirecting only certain ones of the reflector units 22 so that their reflected light is no longer directed toward the energy receiving means 4.

On extremely large installations, the rotation of the entire assembly about a pin 10 may not be practical, in which case the energy receiving means 4 may alone be movable longitudinally in a direction parallel to the horizontal axes of the reflector units 22; or, the entire energy receiving means 4 may be constructed so as to be stationary but considerably longer than the reflector units 22 so that the light reflected by the units 22 will always strike some portion of the energy receiving means 4. Of course, there are many other approaches which may be used to ensure that the reflected energy will strike the energy receiving means 4.

It will be evident that many different types of energy receiving means may be used other than the preferred embodiment which is shown herein. For example, apparatus may be used for performing high temperature experiments on metallurgical specimens placed at the area of convergence of the reflected beams. In view of the prospect of many other modifications within the spirit of the invention, it should be remembered that this invention is not limited only to the disclosed embodiment but encompasses other methods and apparatus within the spirit of the claims which follow:

I claim:

1. Apparatus for collecting radiant solar energy comprising a horizontally elongated energy receiving means, a reflector assembly located in the path of radiant solar energy for reflecting said energy upon the energy receiving means, said reflector assembly having a plurality of reflector units each of which includes a reflector body with a flat horizontally elongated reflective surface which is rotatable about a vertically immovable substantially horizontal axis of rotation which is spaced from the horizontal axes of rotation of other said reflector units, and means for rotatably positioning said reflector bodies about their respective axes of rotation to produce a convergence of radiant solar energy reflected therefrom along the length of the horizontally elongated energy receiving means, said reflector bodies being geometrical prismatic elements with the reflective surfaces thereof constituting one face of the prismatic structure, said prismatic elements having three faces of substantially similar dimensions.

2. The apparatus of claim 1 wherein the reflector units are spaced apart to permit the passage of air therebetween whereby said apparatus is resistant to wind-created forces.

3. The apparatus of claim 1 having means for rotating the reflector bodies and the horizontally elongated energy receiving means about a vertical axis related to the azimuth of the sun to cause the rays of the sun to lie normal to the horizontal axes of the respective reflector units.

4. The apparatus of claim 3, wherein the horizontal axes of the reflector bodies are horizontally immovable with respect to each other and all reflector bodies are horizontally rotatable about a single vertical axis.

5. Apparatus according to claim 1 wherein the means for rotatably positioning said reflector bodies about their respective horizontal axes during normal operation of the apparatus produces equal angular movements of all reflector bodies about their respective horizontal axes, said equal angular movements being related to the elevation of the sun to cause the radiant solar energy reflected thereby to strike the energy receiving means.

6. The apparatus of claim 5 having means for reducing the concentration of solar energy at the energy receiving means by rotating the reflector bodies to reduce the degree of convergence of the reflected beams.

7. The apparatus of claim 6 having means for reducing the concentration of solar energy at the energy receiving means by rotating only some of the reflector bodies so that their reflected light is no longer directed toward the energy receiving means.

8. Apparatus for collecting and receiving solar energy, comprising, means for receiving high intensity radiant solar energy, a primary reflector unit for directing converging beams of solar energy on the energy receiving means, said energy receiving means comprising a housing of stationary inclination having an interior chamber and means at its lower portion for admitting the high, intensity radiant solar energy to the interior chamber, said housing having walls of thermally insulating material, and conduit means for a circulating heat exchange fluid located in an upper portion of the interior chamber in the path of the high intensity radiant solar energy, and an upwardly facing concave secondary reflector means in the housing and located in the path of high intensity radiant solar energy admitted to the interior chamber, said secondary reflector means being horizontally elongated and said secondary reflector means being oriented to reflect the high intensity radiant solar energy upwardly onto said conduit means.

9. The energy receiving means of claim 8 having baffle means located in said interior chamber, said baffle means having a reflective surface facing the conduit means and a non-reflective surface facing the secondary reflector means.

10. The energy receiving means of claim 9 wherein the interior wall of the housing is reflective and the exterior surface of the conduit means is nonreflective.

11. An energy receiving means for receiving high intensity radiant solar energy directed thereupon by a reflector unit, said energy receiving means comprising a housing of stationary inclination having an interior chamber and means at its lower portion for admitting the high intensity radiant solar energy to the interior chamber, said housing having walls of thermally insulating material, and conduit means for a circulating heat exchange fluid located in an upper portion of the interior chamber in the path of the high intensity radiant solar energy, an upwardly facing secondary reflector means located in the path of high intensity radiant solar energy admitted to the interior chamber, said reflector means being oriented to reflect the high intensity radiant solar energy upwardly onto said conduit means, and baffle means located in said interior chamber, said baffle means having a reflective surface facing the conduit means and a non-reflective surface facing the secondary reflector means.

12. A method of collecting and receiving solar energy, comprising the steps of, concentrating solar energy by reflecting and directing converging beams thereof downwardly into the lower portion of a chamber formed of thermally insulating material, reflecting the concentrated solar energy upwardly by a concave horizontally-elongated secondary reflector located in the chamber and receiving the concentrated solar energy at a conduit located in an upper portion of the chamber, and passing a heat exchange fluid through the conduit and then away from the chamber.

* * * * *